United States Patent
Nakagawa

(10) Patent No.: US 7,755,729 B2
(45) Date of Patent: Jul. 13, 2010

(54) LIQUID CRYSTAL DISPLAY AND LIQUID CRYSTAL PROJECTOR

(75) Inventor: Kenichi Nakagawa, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 63 days.

(21) Appl. No.: 11/994,762

(22) PCT Filed: Jul. 3, 2006

(86) PCT No.: PCT/JP2006/313619

§ 371 (c)(1),
(2), (4) Date: May 8, 2008

(87) PCT Pub. No.: WO2007/004721

PCT Pub. Date: Jan. 11, 2007

(65) Prior Publication Data

US 2009/0115941 A1   May 7, 2009

(30) Foreign Application Priority Data

Jul. 5, 2005   (JP) .............................. 2005-195879

(51) Int. Cl.
*G02F 1/13363* (2006.01)
(52) U.S. Cl. ...................................... 349/117; 349/119
(58) Field of Classification Search .................. None
See application file for complete search history.

(56) References Cited

U.S. PATENT DOCUMENTS

| | | | |
|---|---|---|---|
| 5,557,434 A * | 9/1996 | Winker et al. ................ 349/117 |
| 6,339,460 B1 * | 1/2002 | Saitoh ........................ 349/117 |
| 2003/0169391 A1 | 9/2003 | Uchida et al. | |
| 2003/0231270 A1 * | 12/2003 | Kume et al. .................. 349/119 |
| 2004/0085487 A1 * | 5/2004 | Chen et al. ..................... 349/5 |
| 2005/0168662 A1 | 8/2005 | Nakagawa | |
| 2006/0285038 A1 * | 12/2006 | Uchida et al. ............... 349/117 |

FOREIGN PATENT DOCUMENTS

| | | |
|---|---|---|
| JP | 2001-350022 A | 12/2001 |
| JP | 2003-262869 A | 9/2003 |
| JP | 2004-102200 A | 4/2004 |
| JP | 2004-163450 A | 6/2004 |
| WO | 2004/010712 A1 | 1/2004 |

OTHER PUBLICATIONS

K. Ohmuro et al. 33.3: Development of super-high-image-quality vertical-alignment-mode LCD. SID 97 Digest, pp. 845-848 (1997).*

* cited by examiner

*Primary Examiner*—Mike Stahl
(74) *Attorney, Agent, or Firm*—Sughrue Mion, PLLC

(57) ABSTRACT

A polarization azimuth compensation layer (31) is effective in aligning a polarization plane of light obliquely entering an incident-side polarizing plate (30) with a polarization plane of light entering the incident-side polarizing plate (30) in a direction of a normal line. A retardation compensation layer (41) is disposed nearer a liquid crystal layer (34) than a microlens array (40) diffracting part of incident light, to compensate a phase difference due to the liquid crystal layer (34). Diffracted light caused by the microlens array (40) and a TFT circuit pattern (46) enters a polarization azimuth compensation layer (36). The polarization azimuth compensation layer (36) prevents leakage of light by aligning a polarization plane of the diffracted light to be parallel to an absorption axis of an exit-side polarizing plate (37).

4 Claims, 3 Drawing Sheets

LIQUID CRYSTAL DISPLAY AND LIQUID CRYSTAL PROJECTOR

TECHNICAL FIELD

The present invention relates to a liquid crystal display in which a liquid crystal cell is disposed between a pair of polarizers arranged in a cross-nicol or a parallel nicol, and to a liquid crystal projector utilizing the liquid crystal display.

BACKGROUND ART

A liquid crystal cell which performs light modulation with use of optical rotatory property and birefringence in liquid crystal molecules is combined with a polarizing plate (including a polarizing film). The polarizing plate decomposes the incident non-polarized light to two polarized light components which are perpendicular to each other. Further the polarizing plate blocks light of the polarized light component parallel to an absorption axis, and transmits light of the polarized light component perpendicular to the absorption axis. In a transmissive liquid crystal cell, the polarizing plates are disposed at both a light incident surface side and a light exit surface side of the liquid crystal cell. The absorption axes of the polarizing plates are directed perpendicular to each other. The polarizing plate in the light incident surface side functions as the polarizer which converts non-polarized light to specific linearly polarized light and allows the specific linearly polarized light to enter the liquid crystal cell. The polarizing plate in the light exit surface side functions as an analyzer which blocks or transmits modulated light from the liquid crystal cell according to a polarization direction of the modulated light.

The polarizing plates are respectively disposed in front of and at the back of, for example, a TN (Twisted Nematic) liquid crystal cell in a cross-nicol in which absorption axes of the polarizing plate are perpendicular to each other, thus resulting in a liquid crystal display in a normally white mode. The TN liquid crystal cell has rod-shaped liquid crystal molecules filled between a pair of transparent substrates on which transparent electrodes and alignment films are formed. The liquid crystal molecules constitute a liquid crystal layer. When no voltage is applied between the pair of substrates, that is in a normal state, long axes of the liquid crystal molecules are kept approximately parallel to the substrates. The molecules are rotated gradually in a thickness direction of the liquid crystal layer so that the long axes of the liquid crystal molecules twist by 90 degrees as a whole along with the orientation of each of the liquid crystal molecules.

The polarizing plate is originally constructed for absorbing light whose polarization plane is parallel to an absorption axis of the polarizing plate and transmitting light perpendicular to the absorption axis of the polarizing plate among light entering the polarizing plate. As a result, a polarization plane of polarized light having occurred upon entering the polarizing plate in a direction of a normal line of the polarizing plate is not always parallel to a polarization plane of polarized light having occurred upon entering the polarizing plate in a direction inclined with respect to the normal line. That is, since the polarization plane changes depending on the incident azimuth with respect to the polarizing plate, a light extinction ratio in a cross-nicol also depends on the incident angle, thus resulting in a so-called viewing angle dependency. Accordingly, there causes one of reasons for impossibility of achieving a preferable light extinction ratio. It is noted that, the viewing angle dependency may result from the orientation of the liquid crystal itself, which is not related with the present invention.

As disclosed in Japanese Patent Laid-open Publication No. 2001-350022 and the like, two biaxial phase difference plates are laminated on one polarizing plate (polarizer) so that slow-phase axes thereof are perpendicular to each other therebetween. Accordingly, inclination of the polarization plane of linearly polarized light having passed through the polarizing plate is compensated. As a result, the polarization plane of the linearly polarized light having occurred upon entering the polarizing plate in a direction inclined with respect to the direction of the normal line is aligned with linearly polarized light having occurred upon entering the polarizing plate in the direction of the normal line, thus making it possible to prevent leakage of light from the other polarizing plate (analyzer).

TFT (Thin Film Transistor)-LCD causes a transistor to control turning on and off of a voltage to be applied to an area corresponding to one pixel of the liquid crystal layer. Therefore, the switching between on and off for each pixel is conducted fast and accurately. As a result, the TFT-LCD is used widely for a display requiring high image quality. The TFT-LCD includes a TFT substrate on which a TFT array, a wiring pattern of the TFT array, and a transparent pixel electrode are formed, and a opposed substrate on which a common electrode corresponding to the pixel electrode of the TFT substrate is formed.

The TFT substrate and the opposed substrate consist of a transparent glass substrate, for example. In the liquid crystal projector, the TFT substrate is disposed at a project lens side. The opposed substrate is disposed at a light source side. On the opposed substrate, in order to prevent malfunction due to strong light applied to the TFT, is formed a black matrix (light shielding layer) arranged in a matrix fashion for protecting the TFT from light. Additionally, in order to prevent loss of light due to the black matrix, a microlens array is disposed on the opposed substrate so that light emanated from the light source is condensed for each pixel, and light passes through an opening of the black matrix.

However, a panel size of the TFT-LCD for use in the liquid crystal projector is smaller than that of the TFT-LCD for use in a direct-view type display. Therefore, in order to project a high-resolution image on a screen, the pixel density becomes considerably high, and a microlens array, a TFT array, and a black matrix are arranged with a pitch of approximately 10 µm. Accordingly, a structure having periodic microstructures, such as the microlens array, the TFT array, the black matrix, and the like allows part of incident light to diffract, thereby causing a phenomenon in which predetermined incident light diffuses by approximately 10 degrees at one time, and in total, 20 to 30 degrees. As a result, there arises a problem in which when part of light having passed through the incident-side polarizing plate passes through the exit-side polarizing plate, its incident angle on the latter is varied to cause leakage of light from the exit-side polarizing plate. This problem occurs in addition to the problem of viewing angle dependency of the polarizing plate based on the azimuth angle of incidence described above, thus making it difficult to solve both problems.

A primary object of the present invention is to provide a liquid crystal display and a liquid crystal projector capable of compensating displacement of a polarization plane due to a viewing angle dependency of a polarizing plate and compensating diffraction due to a structure of a liquid crystal cell.

Another object of the present invention is to provide a liquid crystal display and a liquid crystal projector capable of displaying an image of high contrast without causing brightness unevenness by preventing leakage of light in a wide viewing angle, independent from the operation mode of the liquid crystal.

DISCLOSURE OF INVENTION

In order to achieve the object and other objects, according to the present invention, there is provided a liquid crystal display including a polarization azimuth compensator disposed at least one of between an incident-side polarizer and a liquid crystal cell and between an exit-side polarizer and the liquid crystal cell to compensate an azimuth of a polarization plane. The liquid crystal cell includes liquid crystal sealed between a pair of transparent substrates.

The liquid crystal cell includes a structure and a retardation compensator. The structure has periodic microstructures formed on at least one of said pair of transparent substrates. The periodic microstructures are arranged with a pitch allowing diffraction of visible light. The retardation compensator is disposed at the side of the liquid crystal layer with respect to the structure to compensate a phase difference due to the liquid crystal layer.

The polarization azimuth compensator is preferably obtained by laminating two biaxial phase difference layers. Further, the polarization azimuth compensator preferably includes a laminated structure formed of a C plate and an A plate.

Preferably, absorption axes of the incident-side polarizer and the exit-side polarizer are perpendicular to one another.

Preferably, the polarization azimuth compensator rotates the polarization plane of polarized light, and aligns the azimuth irrespective of a difference in an incidence angle.

Preferably, the liquid crystal cell further includes a first alignment film positioned between the liquid crystal layer and the polarization azimuth compensator at the incident-side polarizer, and a second alignment film positioned between the liquid crystal layer and the polarization azimuth compensator at the exit-side polarizer.

The liquid crystal projector of the present invention includes a liquid crystal display having a polarization azimuth compensator.

According to the present invention, even when light with various viewing angles enter the incident-side polarizing plate, the polarization planes of respective light become aligned with each other by the polarization azimuth compensator. Accordingly, a phase difference due to the liquid crystal layer can be compensated with high accuracy. Additionally, even when light is diffracted and diffuses due to the structure having the microstructures, the polarization azimuth compensator compensates the polarization plane according to the incident angle with respect to the exit-side polarizing plate. Therefore, deterioration of light extinction ratio in the cross-nicol due to a diffraction of light can be prevented. Thereby, leakage of light from the liquid crystal layer in the black display state can be suppressed to small, and the evenness of contrast, viewing angle, and brightness is improved. In particular, the liquid crystal display is further effective for preventing deterioration of light extinction ratio in a liquid crystal projector because the panel size of the liquid crystal display is small, and the pixel density thereof is high to form a high-resolution image.

BEST MODE FOR CARRYING OUT THE INVENTION

Figure 1:
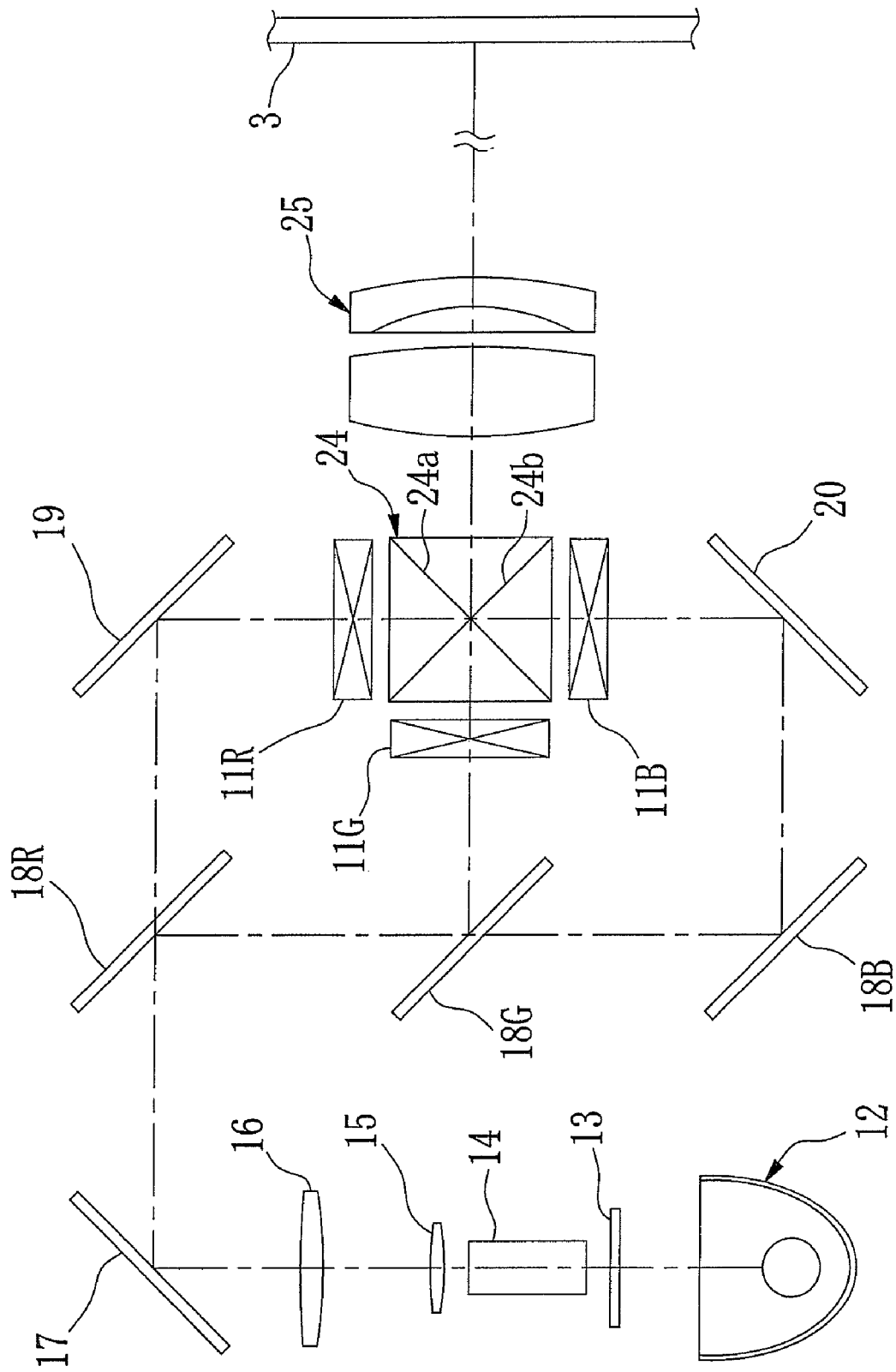
FIG. 1 is a schematic diagram showing constitution of a liquid crystal projector of the present invention.

As shown in FIG. 1, a liquid crystal projector 10 includes three transmissive-type liquid crystal display panels 11R, 11G, and 11B to project a full color image on a screen 3. White light emanated from a light source 12 passes through a filter 13 that blocks ultraviolet rays and infrared rays. An end surface of a glass rod 14 is located at the vicinity of a focal point of an ellipsoidal mirror for use in the light source 12. White light emanated from the light source 12 passes through the glass rod 14, thus resulting in a uniform intensity distribution.

The white light emanated from the glass rod 14 is collimated by a relay lens 15 and a collimate lens 16. The collimated light enters a mirror 17. The white light reflected by the mirror 17 enters a dichroic mirror 18R that transmits red light. After passing through the dichroic mirror 18R, the red light is reflected by a mirror 19 to illuminate the liquid crystal display panel 11R from behind.

The green light and blue light reflected by the dichroic mirror 18R are split into two light fluxes, one of which includes green light and the other of which includes blue light, by a dichroic mirror 18G that reflects green light. The green light reflected by the dichroic mirror 18G illuminates the liquid crystal display panel 11G from behind. After passing through the dichroic mirror 18G, the blue light is reflected by mirrors 18B and 20 to illuminate the liquid crystal display panel 11B from behind.

The liquid crystal display panels 11R, 11G, and 11B respectively form a gray scale image of three primary colors. A composite prism 24 is disposed so as to be equidistant from each liquid crystal display panel 11R, 11G, and 11B. Illumination light emanated from the light source 12 passes through the liquid crystal display panels 11R, 11G, and 11B to be converted to image light to which image information is assigned. Thereafter, the image light of three colors are compounded by a composite prism 24 provided with dichroic surfaces 24a and 24b. The compounded image light is projected on the screen 3 by a projection lens 25 to display a full color image.

Figure 2:
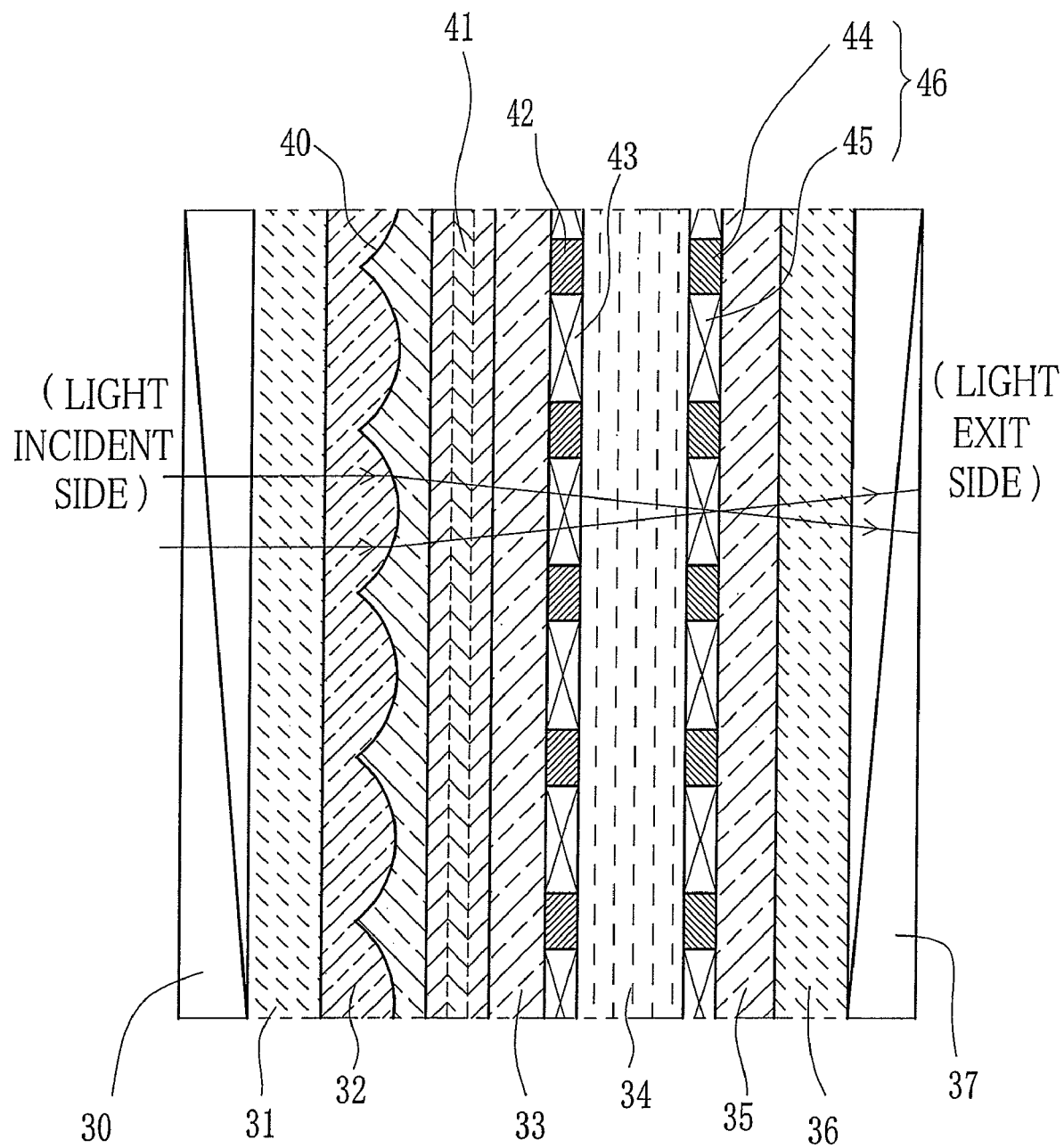
FIG. 2 is a cross-sectional view showing constitution of a liquid crystal display panel of the present invention.

As shown in FIG. 2, the liquid crystal display panel 11R includes an incident-side polarizing plate 30, a polarization azimuth compensation layer 31, a microlens array (MLA) substrate 32, an opposed substrate 33, a liquid crystal layer 34, a thin film transistor (TFT) substrate 35, a polarization azimuth compensation layer 36, and an exit-side polarizing plate 37 formed integrally in this order from the light source side. The incident-side polarizing plate 30 and the exit-side polarizing plate 37 are arranged in a cross-nicol in which their absorption axes are perpendicular to each other. The incident-side polarizing plate 30 functions as a polarizer which converts incident light to linearly polarized light. The exit-side polarizing plate 37 functions as an analyzer which analyzes linearly polarized light having passed through an interior of the liquid crystal display panel 11R. It is noted that the liquid crystal display panels 11G and 11B have the same structure as that of the liquid crystal display panel 11R.

The polarization azimuth compensation layer 31 consists of a biaxial phase difference layer, and has a rotatory power to rotate a polarization plane of light entering the incident-side polarizing plate 30 in accordance with the incident angle thereof, thus aligning polarization planes of light having passed through the incident-side polarizing plate 30 in the same direction. Thereby, all the polarization planes of light having passed through the incident-side polarizing plate 30 are parallel to the polarization planes of light perpendicularly entering the incident-side polarizing plate 30. The MLA substrate 32 includes a microlens array (MLA) 40 on which a plurality of microlenses are arranged in a matrix fashion with a pitch of approximately 10 μm so as to correspond to one pixel. Each microlens functions as a convex lens for condensing light from light incident side. On an outer surface of the opposed substrate 33, a retardation compensation layer 41 for compensating phase difference due to the liquid crystal layer 34 is formed. On an inner surface of the opposed substrate 33, black matrixes 42 and transparent common electrodes 43 are formed. The black matrix 42 is a light shielding layer formed of a chromium film, for example.

On an inner surface of the TFT substrate 35, a liquid crystal cell has a TFT circuit pattern 46 in which thin film transistors (TFTs) 44 and pixel electrodes 45 are arranged in a matrix fashion. The black matrix 42 protects the thin film transistor 44 from incident light. Thereby, malfunction due to incident light entering the thin film transistor 44 is prevented. The black matrix 42 and the thin film transistor 44 are arranged with a pitch of approximately 10 μm as in the case of the microlens array 40. The black matrix 42 and the TFT circuit pattern 46 are respectively formed on the opposed substrate 33 and the TFT substrate 35 in a parallel cross structure or a grid.

When the thin film transistor 44 in the liquid crystal cell is turned on, a voltage is applied between the pixel electrode 45 and the common electrode 43. Then, an electric field occurs in an area corresponding to one pixel of the liquid crystal layer 34 to change orientation of liquid crystal molecules. It is noted that, between the liquid crystal layer 34 and the common electrode 43, and between the liquid crystal layer 34 and the pixel electrode 45, respectively formed is an alignment film (not shown) which aligns the liquid crystal molecules of the liquid crystal layer 34 in a predetermined direction when no voltage is applied thereto.

The liquid crystal layer 34 is sealed between an inner surface of the opposed substrate 33 and an inner surface of the TFT substrate 35. The liquid crystal layer 34 consists of a well-known Twisted Nematic (TN) mode liquid crystal layer in which the orientation of the liquid crystal molecules is twisted by 90 degrees while being parallel to the substrate surfaces when no voltage is applied thereto. In the TN mode liquid crystal layer, when no voltage is applied thereto, the polarization plane of the linearly polarized light having passed through the incident-side polarizing plate 30 is twisted by 90 degrees, and the linearly polarized light passes through the exit-side polarizing plate 37, thus resulting in a white display state. In contrast, when a voltage is sufficiently applied thereto, the orientation of the liquid crystal molecules is approximately perpendicular to the substrate surfaces. Therefore, the linearly polarized light having passed through the incident-side polarizing plate 30 passes through the liquid crystal layer 34 without changing the polarization plane thereof, and reaches the exit-side polarizing plate 37, thus resulting in a black display state.

The polarization azimuth compensation layer 36 formed between the TFT substrate 35 and the exit-side polarizing plate 37 consists of the biaxial phase difference layer as in the case of the polarization azimuth compensation layer 31, and has a rotatory power to rotate the polarization plane of the light entering the polarization azimuth compensation layer 31 in accordance with the incident angle thereof. When the liquid crystal layer 34 is in the black display state, light emanated from the TFT substrate 35 in various directions is linearly polarized light whose polarization planes are parallel to each other. Light whose azimuths of polarization planes are parallel to each other enter the polarization azimuth compensation layer 36. The polarization azimuth compensation layer 36 further rotates the polarization planes of the linearly polarized light in the same direction according to the incident azimuth thereof and magnitude of the polar angle in a state where the azimuths of the polarization planes of incident linearly polarized light are equal to each other. The linearly polarized light with its polarization plane rotated travels in a direction parallel to the absorption axis of the exit-side polarizing plate 37 in accordance with the incident angle thereof.

The retardation compensation layer 41 consists, for example, of a discotic liquid crystal layer in which discotic liquid crystal compounds having a disk-shaped molecular structure are polymerized in a case of the TN mode liquid crystal. The discotic liquid crystal layer is immobilized in a hybrid alignment in which the orientation of the liquid crystal molecules is continuously changed in the thickness direction of the liquid crystal layer between the upper layer side and the lower layer side. When the TN mode liquid crystal layer is in the white display state, the liquid crystal molecules located in a center portion of the TN mode liquid crystal layer stand at right angles. In contrast, the liquid crystal molecules located at the vicinity of the substrate surface are in a hybrid alignment in which a tilt angle is varied within the plane. Accordingly, owing to the discotic liquid crystal layer in the hybrid alignment, the phase difference due to the TN mode liquid crystal layer can be compensated. This invention, however, does not specify the means of retardation compensation.

Figure 3:
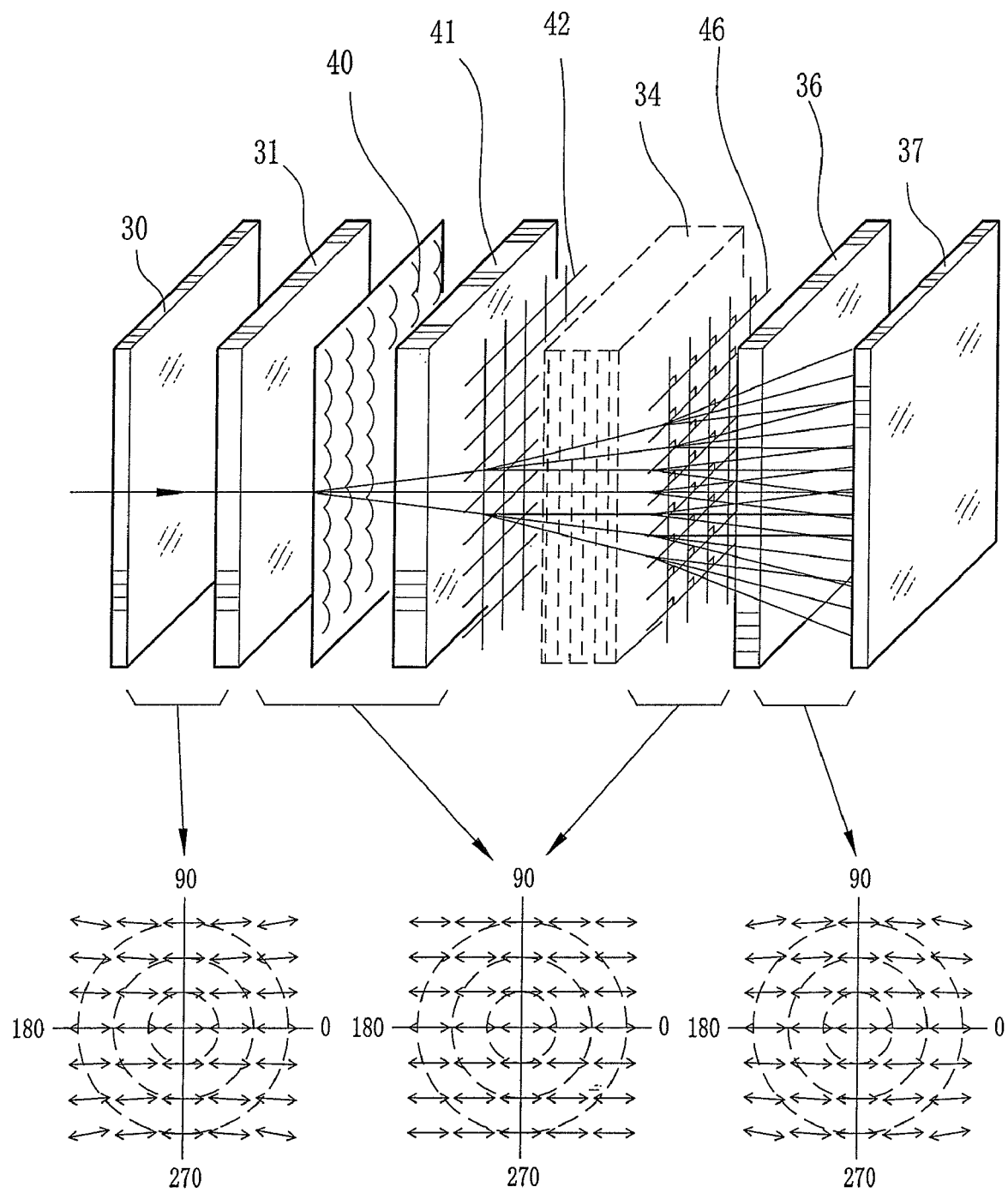
FIG. 3 is a perspective view schematically showing constitution of the liquid crystal display panel.

Next, an operation of the present invention is explained hereinbelow. As shown in FIG. 3, light enters the liquid crystal display panel 11R from every direction, and passes through the incident-side polarizing plate 30, thus becoming linearly polarized light. At this time, the azimuths of the polarization planes of the linearly polarized light are approximately parallel to each other. However, in a precise sense, the polarization planes rotate depending on the azimuth angle of incident. Rotational angles of the rotational differences are greater according to the greatness of the polar angle of an incident direction of a light component upon the incidence at an azimuth of 45 degrees with respect to the absorption axis of the incident-side polarizing plate 30, upon the incidence at an azimuth of 45 degrees with respect to the absorption axis of the incident-side polarizing plate 30, in comparison with light which is incident in the plane containing the absorption axis of the incident-side polarizing plate 30. Azimuth of the incidence of the incident light components and directions of the polarization planes for respective polar angles, when indicated in a graph in FIG. 3, are distributed in a bobbin shape. (In other words, polarizing directions are inclined upwards in corner regions in the frame away from the central region.) When the linearly polarized light having passed through the incident-side polarizing plate 30 enters the polarization azimuth compensation layer 31, the azimuth of the polarization plane thereof becomes equal to that of the polarization plane of light which enters the polarization azimuth compensation layer 31 in the direction of the normal line with the polar angle of 0 degree.

Incident light from each direction enters the MLA substrate 32 having the microlens array 40. The incident light from each direction condenses due to an operation of a convex lens when passing through the microlens array 40 formed with a pitch of approximately 10 μm. Additionally, part of the incident light causes a diffraction phenomenon and diffuses from a direction where the part of the incident light enters the incident-side polarizing plate 30 initially. The diffracted incident light enters the retardation compensation layer 41 without changing its polarization plane. When a component of incident light passing through the retardation compensation layer 41 is parallel to the direction of the normal line, the component passes therethrough without being suffered any influence. Additionally, a component of incident light which advances obliquely with respect to the direction of the normal line comes to have a negative phase difference whose magnitude corresponds to the inclined angle thereof. Incident light having passed through the retardation compensation layer 41 passes through the opening of the black matrix 42 with the intermediation of the opposed substrate 33, and enters the liquid crystal layer 34. When passing through the black matrix 42, part of the incident light advancing in each direction causes a diffraction phenomenon and further diffuses.

Although part of incident light having reached the liquid crystal layer 34 advances in a varied direction due to the diffraction in the black matrix 42, most incident light passes through the liquid crystal layer 34 at the same angle as that at which the incident light passes through the retardation compensation layer 41 initially. When the liquid crystal layer 34 is in the black display state, incident light parallel to the direction of the normal line passes therethrough without being suffered from any influence of the perpendicular orientation of the liquid crystal molecules. Additionally, incident light which advances obliquely with respect to the direction of the normal line comes to have a positive phase difference due to birefringence of the liquid crystal molecules. The angle made by the incident light passing through the liquid crystal layer 34 is equal to the angle made by the incident light passing through the retardation compensation layer 41. Accordingly, a phase difference applied to incident light advancing in each direction becomes zero in principle. That is, the azimuth of the polarization plane of each incident light is equal to that of the polarization plane at the time immediately after the incident light passes through the polarization azimuth compensation layer 31. As a result, the azimuths of all the polarization planes of incident light become parallel to each other.

When incident light having passed through the liquid crystal layer 34 enters the TFT circuit pattern 46, part of the incident light further causes a diffraction phenomenon and diffuses. However, polarization plane of each light suffers no changes. Incident light having passed through the TFT circuit pattern 46 enters the polarization azimuth compensation layer 36 with the polarization planes thereof parallel to each other. Rotational angles of the compensation of an incident light component having passed the polarizing azimuth compensation layer 36 are greater according to the greatness of the polar angle of the light component upon the incidence at an azimuth of 45 degrees according to the polarization azimuth compensation layer 36 with respect to the slow axis of the polarization azimuth compensation layer 36. Azimuths of the incidence of the incident light components and directions of the polarization planes for respective polar angles, when indicated in a graph in FIG. 3, are distributed in a barrel shape. (In other words, polarizing directions are inclined downwards in corner regions in the frame as viewed from the central region.) The azimuth of the polarization plane of incident light having passed through the polarization azimuth compensation layer 36 is parallel to the absorption axis of the exit-side polarizing plate 37, that is, perpendicular to a transparent axis of the exit-side polarizing plate 37 for every advancing direction thereof. Accordingly, no light passes through the exit-side polarizing plate 37, thus achieving the preferable black display state.

As described above, in the liquid crystal display panel 11R, light enters the incident-side polarizing plate 30 from various directions, and even when the polarization plane of the incident light changes depending on the incident azimuth and the polar angle, the polarization azimuth compensation layers 31 and 36 convert the incident light to incident light having a polarization plane parallel to the absorption axis of the exit-side polarizing plate 37. Accordingly, no light leaks from the exit-side polarizing plate 37, thus making it possible to achieve a liquid crystal display and a liquid crystal projector with high light extinction ratio (contrast).

Further, in the liquid crystal display panel 11R, when light passes through a structure in which periodic microstructures having constant regularity are formed, such as the microlens array 40, the black matrix 42, and the TFT circuit pattern 46, part of the light causes a diffraction and diffuses in a case where the structure has refractive index difference at its phase boundary or in a case where the structure is an opaque body. However, the angle made by light entering the liquid crystal layer 34 and the angle made by light entering the retardation compensation layer 41 are kept equal to each other, thus achieving preferable phase difference compensation. As a result, the light extinction ratio (contrast) of one pair of polarizing plates arranged in the cross-nicol is enhanced dramatically.

It is noted that the present invention is not limited to the above embodiment. For example, the retardation compensation layer 41 may be formed between the liquid crystal layer 34 and the TFT circuit pattern 46 (to be exact, between the alignment film at the side of the TFT substrate and the TFT circuit pattern 46). Additionally, in consideration of a diffraction phenomenon to be caused by the black matrix 42; the retardation compensation layer 41 may be formed between liquid crystal layer 34 and a wiring pattern of the common electrode 43 disposed nearer the liquid crystal layer 34 than the black matrix 42 (to be exact, between the common electrode 43 and the alignment film at the side of the opposed substrate 33). Namely, it is sufficient to form the retardation compensation layer so that the retardation compensation layer is nearer the liquid crystal layer than the structure having the microstructures which may cause a diffraction phenomenon. When the retardation compensation layer is formed in such positions, in principle, a further preferable contrast improvement effect can be expected. In contrast, giving priority to reduction of cost rather than performance and structure, the retardation compensation layer 41 may be omitted.

Further, the present invention is applicable to not only a liquid crystal projector of three plates but also a liquid crystal projector of one plate utilizing a liquid crystal display provided with a mosaic color filter. Additionally, the liquid crystal layer 34 may be applied not only to the TN mode liquid crystal but also a liquid crystal layer of other operation modes. That is, it is sufficient to use a retardation compensation layer corresponding to a liquid crystal layer of each operation mode.

For example, when a Vertically-Aligned Nematic (VAN) mode liquid crystal layer is used, in which the orientation of the liquid crystal molecules representing nematic liquid crystallinity when no voltage is applied thereto is perpendicular to the substrate surface, the retardation compensation layer 41 may be an uniaxial birefringence plate serving as a C plate whose optical axis is perpendicular to the substrate surface. It is sufficient that the C plate has negative refractive index anisotropy in order to compensate the positive phase difference due to the VAN liquid crystal. For example, an inorganic form birefringence plate (including sheet or film) is preferable, which is obtained by laminating an inorganic material with high refractive index and inorganic material with low refractive index alternately plural times by using the direction of the normal line of the substrate surfaces as a direction for lamination. Additionally, in order to compensate the phase difference due to VAN liquid crystal, it is also effective, in addition to the C plate, to use a retardation compensation layer which is obtained by further laminating an A plate having an optical axis within the substrate surface and an O plate whose optical axis is inclined with respect to the substrate surface.

Not only the TN liquid crystal and the VAN liquid crystal but also a liquid crystal cell of each operation mode such as an In-plane Switching (IPS) mode, an Optically Compensatory Bend (OCB) mode, an Electrically Controlled Birefringence (ECB) mode, and the like can be used. Accordingly, a retardation compensation layer which is suitable for a liquid crystal cell of each operation mode can be used.

Further, the polarization azimuth compensation layers 31 and 36 are not limited to a phase difference plate obtained by laminating two biaxial birefringence plates. As described in Japanese Patent Laid-open Publication No. 2001-350022, a laminated body formed of the C plate and A plate is also preferable as the polarization azimuth compensator for use in the present invention. The C plate whose optical axis is perpendicular to the substrate surface and the A plate having the optical axis within the substrate surface can be formed from inorganic materials as the structural birefringence plate by photolithography or an oblique deposition method. It is noted that the birefringence plate for use as the polarization azimuth compensation layer may also serves as a support of the polarizing plate.

Further, in the above embodiment, the polarization azimuth compensation layers 31 and 36 are respectively formed in the light incident side and the light exit side to compensate the rotation of the polarization plane of incident light in both the light incident side and the light exit side. However, the present invention is not limited thereto. In consideration to cost and effect, the polarization azimuth compensation layers 31 and 36 may be formed only in the light exit side or only in the light incident side.

INDUSTRIAL APPLICABILITY

The present invention is applied to a liquid crystal display and a liquid crystal projector.

The invention claimed is:

1. A liquid crystal projector including a liquid crystal display, said liquid crystal display having a liquid crystal cell in which a liquid crystal is sealed between a pair of transparent substrates, and an incident-side polarizer and an exit-side polarizer respectively disposed in front of and at the back of said liquid crystal cell, said liquid crystal projector comprising:
    a polarization azimuth compensator, disposed between said incident-side polarizer and said liquid crystal cell and/or between said exit-side polarizer and said liquid crystal cell, for compensating an azimuth of a polarization plane;
    a TFT circuit pattern formed on one of said pair of transparent substrates; and
    a black matrix formed on the other one of said pair of transparent substrates,
    wherein said TFT circuit pattern and said black matrix have periodic microstructures arranged with a pitch allowing diffraction of visible light.

2. The liquid crystal projector as claimed in claim 1, further comprising:
    a retardation compensator disposed nearer to said liquid crystal layer than said TFT circuit pattern or said black matrix to compensate a phase difference due to said liquid crystal layer.

3. The liquid crystal projector as claimed in claim 1, wherein said polarization azimuth compensator includes a biaxial phase retardation layer.

4. The liquid crystal projector as claimed in claim 1, wherein said polarization azimuth compensator includes a laminated structure formed of a C plate and an A plate.

* * * * *